United States Patent [19]

Pfarrer

[11] Patent Number: 4,465,960

[45] Date of Patent: Aug. 14, 1984

[54] STARTING ARRANGEMENT FOR TWO-SPEED SINGLE-PHASE REFRIGERANT COMPRESSOR MOTOR

[75] Inventor: David M. Pfarrer, Hurst, Tex.

[73] Assignee: Lennox Industries, Inc., Dallas, Tex.

[21] Appl. No.: 406,360

[22] Filed: Aug. 9, 1982

[51] Int. Cl.³ ............................................. H02P 1/44
[52] U.S. Cl. .................................... 318/774; 318/779
[58] Field of Search ............................... 318/778–779, 318/783–786, 788–794

[56] References Cited

U.S. PATENT DOCUMENTS 4,066,937  1/1978  Pfaurer et al. ...................... 318/789
4,082,989  4/1978  Pfaurer ................................ 318/779
4,161,681  7/1978  Rathje .................................. 318/783
4,366,425  12/1982  Shen ..................................... 318/779

Primary Examiner—Truhe J. V.
Assistant Examiner—A. Evans
Attorney, Agent, or Firm—Allegretti, Newitt, Witcoff & McAndrews, Ltd.

[57] ABSTRACT

An improved control circuit for a single-phase two-speed motor as used in a hermetic refrigerant compressor which includes start assist means is disclosed. In the preferred aspect of the invention, a start assist means is disposed between the start capacitor means and the run capacitor means for providing a discharge path for the run capacitor means into the start capacitor means after the motor is deenergized.

4 Claims, 2 Drawing Figures

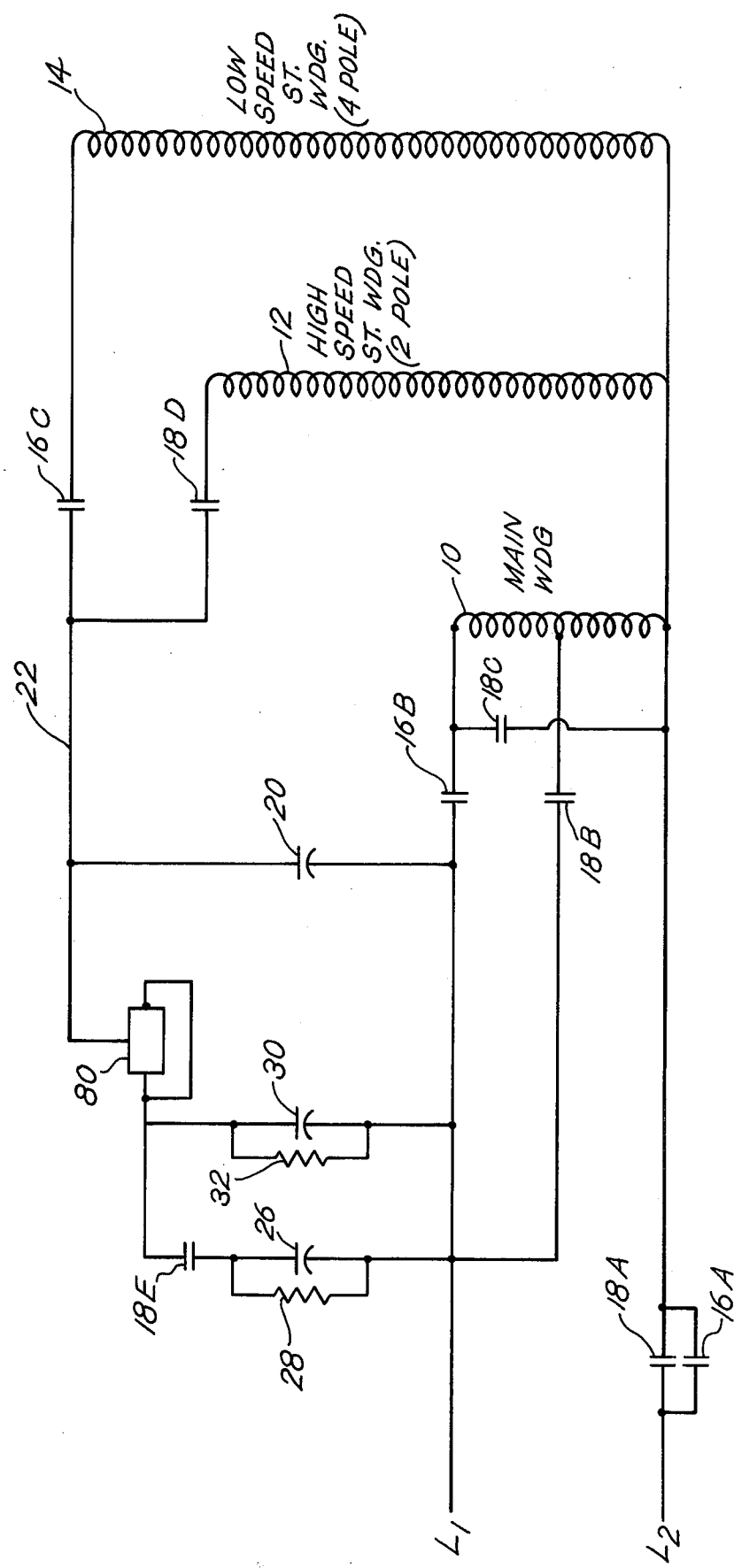

STARTING ARRANGEMENT FOR TWO-SPEED SINGLE-PHASE REFRIGERANT COMPRESSOR MOTOR

BACKGROUND OF THE INVENTION

This invention relates to an improved motor control means and more particularly, to an improved motor control means for a two-speed single-phase refrigerant compressor motor.

Conventional single-phase alternating current induction motors for driving refrigerant compressors are connected to a source of power by a line contactor. In circuit with the main motor winding and the start winding are a run capacitor and a start capacitor. A start relay including a coil in parallel with the motor start winding or windings and normally closed start relay contacts in series with the start capacitor are provided. When the contactor is energized, its contacts close. The start relay coil senses the start winding voltage and is energized at a predetermined value as the start winding voltage increases during motor acceleration. Upon attainment of the predetermined value and energization of the start relay coil, the start relay contacts open. The start capacitor is operatively removed from the circuit. Assuming that the start relay is properly sized for the application, it will stay energized during all expected load and voltage conditions.

When the line contactor is deenergized and power is removed from the motor circuit, the main winding and start winding voltages drop to zero. The start relay coil is deenergized and the start relay contacts close. If the start relay coil should happen to open when the run capacitor is fully charged, there is a large amount of energy stored in the run capacitor that can be discharged into the start capacitor when the start relay contacts close. There is sufficient energy to weld the start relay contacts and thus disable the relay for the next operation.

An improved motor control for a single phase two-speed motor for a refrigerant compressor is disclosed in Pfarrer et al, U.S. Pat. No. 4,066,937, the teachings of which are incorporated herein by reference. In Pfrarrer et al, the motor control incorporates a negative temperature coefficient thermistor for controlling the discharge of the run capacitor so as to prevent welding of the start relay contacts. However, problems with the Pfarrer et al motor control have arisen due to limitations on the size of the start capacitor, which prevent the use of better starting torques.

In Pfarrer, U.S. Pat. No. 4,082,989, there is disclosed a two-speed motor control incorporating a start relay that works on both 2-pole and 4-pole connections. However, due to the different starting characteristics of the two start windings in the two-speed motor, it is very difficult to size a start relay that operates effectively on both 2-pole and 4-pole connections. From this background, the present invention was developed.

SUMMARY OF THE INVENTION

It is an object of the present invention to provide an improved motor control for single-phase two-speed motors which overcomes the problem of limitations on the size of the start capacitance in order to have better starting torques.

A further object of the present invention is to provide an improved motor control for a single-phase two-speed motor for a refrigerant compressor which incorporates a start assist device for properly and economically providing a current discharge path for the run capacitor through the start assist device and the start capacitor.

Still another object of the present invention is to provide an improved motor control for single-phase two-speed motors which overcomes the problem of the welding of the start relay contacts in an effective and inexpensive fashion by replacing the start relay contacts and a negative temperature coefficient thermistor with a less expensive start assist device which can be used for various motor sizes.

These and other objects, advantages and features of the invention will be set forth in the detailed description which follows.

BRIEF DESCRIPTION OF THE DRAWING

In the detailed description which follows, reference is made to the drawing comprised of the following figures:

FIG. 2 is an electrical schematic circuit diagram of an improved single-phase two-speed motor circuit incorporating a start assist device.

DETAILED DESCRIPTION OF THE PREFERRED EMBODIMENT

Figure 1:
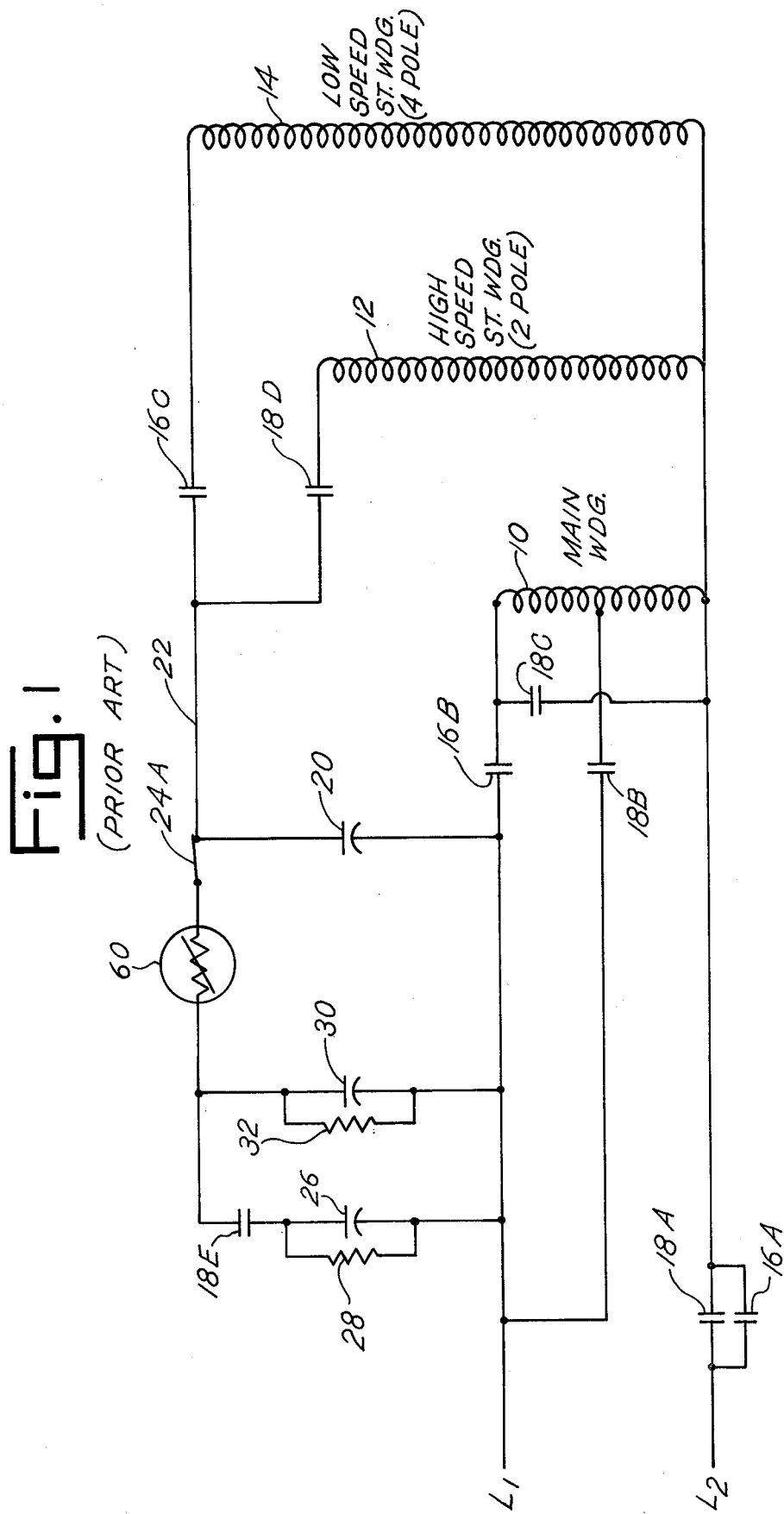
FIG. 1 is an electrical schematic circuit diagram of a prior art two-speed single-phase motor circuit embodying a negative temperature coefficient thermistor.

With reference to FIG. 1, there is illustrated a prior art circuit for a single-phase two-speed alternating current induction motor incorporating a negative temperature coefficient thermistor. Power is supplied to the circuit from a suitable source through lines $L_1$, $L_2$. The motor includes a main winding 10, a high speed start winding 12, and a low speed start winding 14. The low speed line contactor includes contacts 16A, 16B and 16C. The high speed line contactor includes contacts 18A, 18B, 18C, 18D and 18E. The run capacitor 20 is connected across lead line $L_1$ and the line 22. A relay coil (not shown) is connected across the start windings and a normally closed contact 24A is provided in the line 22. Also connected between the lead line $L_1$ and the line 22 is a start capacitor 26 in series with the contact 18E. A bleed resistor 28 is provided in parallel with the start capacitor 26. Disposed in parallel with capacitor 26 is a start capacitor 30 which also has a bleed resistor 32 in parallel therewith. A negative temperature coefficient thermistor 60 is placed in the circuit in line 22.

Considering the operation of the prior art circuit of FIG. 1, when the low speed contactor is energized, contacts 16A, 16B and 16C are closed and power is supplied from lead line $L_1$ through the start capacitor 30, negative temperature coefficient thermistor 60, normally closed contact 24A, contact 16C, low speed winding 14 and the contact 16A to lead line $L_2$. The main winding 10 is energized through lead line $L_1$, contact 16B, main winding 10 and contact 16A. Thermistor 60 is at its ambient temperature state or its cold state and has a high resistance, on the order of 5 ohms. This limits the current flow and reduces the effective start capacitance and the motor starting torque. As current passes through the negative temperature coefficient thermistor 60, the thermistor 60 heats up and its resistance is reduced, allowing the starting current to increase until sufficient motor torque is developed and the motor begins to accelerate. The relay coil for contact 24A will be energized at a predetermined time during acceleration of the low speed start winding 14 and the contact 24A will be opened, thus taking the start capacitor 30 as well as the thermistor 60 out of the circuit. The thermistor 60 will cool and its resistance will increase to its original value.

When the low speed contactor is deenergized, contacts 16A, 16B and 16C will open and the motor is deenergized. Power is removed from the start relay coil and the contacts 24A will open. By this time, the thermistor 60 is cool and its resistance is high. Thus, there will be a limit on the amount of current that will be discharged into the start capacitor 30 from the charge stored in the run capacitor 20 through the contacts 24A. This current is limited to a value safe to preclude welding of the contacts 24A. The thermistor 60 will function similarly during high speed motor operation to limit the current discharged into the start capacitor means from the run capacitor 20 when the motor is deenergized after use.

Although the use of the negative temperature coefficient thermistor 60 can prevent welding of the start relay contacts 24A, it limits the size of the start capacitor, hence the value of start capacitance, thereby preventing better starting torques from being obtained and utilized.

A less costly and presently preferred solution is disclosed in FIG. 2. A start assist means 80 replaces the more costly start relay and thermistor 60 and provides the desired advantageous results.

The start assist means 80 has a relatively low resistance, on the order of 12.5 ohms at 25° C. At either high speed or low speed start up, this low resistance allows current flow through the circuit, utilizing start capacitor 26 for the needed starting torque. The start capacitor 26 can be sized in combination with a particular start assist means 80 and motor in order to obtain the desired starting torques. As current flows through the circuit and the start assist means 80 and accelerates the motor to load speeds, the start assist means 80 is heated up. This heat causes the resistance of the start assist means to increase approximately 1000 times its resistance at 25° C. The high resistance reduces the current to milliamperes and thus acts similarly to a contact opening and renders the circuit inoperative, effectively operating as does a start relay coil. The start capacitor 26 is turned off after the motor reaches operating speed.

The response time to switch the circuit off varies from about 0.3 seconds, when the start assist means 80 is at 25° C., to about 0.65 seconds when the start assist means 80 has been running stabilized and is hot. These times allow proper starts and there are no contacts to weld. In low speed operation of the circuit utilizing the start assist means 80, normally open contacts 16A, 16B and 16C will be closed. In high speed operation, normally open contacts 18A, 18B, 18C, 18D and 18E will be closed. The utilization of the start assist means 80 provides a current discharge path for run capacitor 20 through the start assist means 80 into the start capacitor 30 when the low speed contactor means is deenergized and into start capacitor 26 when the motor is deenergized after high speed operation.

The start assist means 80 does not depend on start winding voltage for pick up and drop out as does a relay coil and, thus, differences between start winding characteristics are not as critical in the motor design as with the prior art circuit of FIG. 1. This allows motor design freedom for better running performance. The circuit with the start assist means 80 has been tested and has proven efficacious in use. Reliability of operation with the circuit of the present invention is improved because of the elimination of switching reactive loads through contacts, such as 24A in FIG. 1, which have a finite life and because varying motor sizes and voltage ranges do not affect the start assist means 80 to the extent they affect operation with a start relay coil.

A start assist means that has been found satisfactory for use in a circuit of the present invention is the positive temperature coefficient thermoresistor (PCTR) device, Type 305C, described in Sprague Electric Company Engineering Bulletin 7701A. Such a PCTR motor-starting device has a resistance of 12.5 ohms at 25° C. and is designed to operate at ambient temperatures of −30° C. to +65° C.

There has been provided by the present invention an improved circuit for use with a two-speed single-phase motor as may be applied in a hermetic refrigerant compressor less expensively than with a circuit incorporating a negative temperature coefficient thermistor. The present invention lies in the combination of a start assist device in the invention disclosed in Pfarrer et al, U.S. Pat. No. 4,066,937, in lieu of the thermistor and start relay contacts, to provide a circuit which can be used on both 2-pole and 4-pole connections. The novel inventive circuit of this invention does not limit the size of start capacitance, can be used for various size motors and provides a current discharge path for the run capacitor through the start assist device into the start capacitor without welding the start relay contacts.

It should be understood that the foregoing disclosure emphasizes certain specific embodiments of the invention and that all modifications or alternatives equivalent thereto are within the spirit or scope of the invention as set forth in the appended claims.

I claim as my invention:

1. In an improved control circuit for use with a single-phase two-speed motor of the type in which said circuit comprises a main winding, a start winding means including a low speed start winding and a high speed start winding in circuit with the main winding and adapted to provide either a high speed operation or low speed operation, low speed contractor means, high speed contractor means, start capacitor means and run capacitor means, wherein the improvement comprises:
   start assist means electrically disposed in said circuit between the start capacitor means and the run capacitor means, said start assist means being a positive temperature coefficient thermistor, said thermistor limiting the current to the start windings from a source of power and limiting the current discharged into the start capacitor means from the run capacitor means when the two speed motor is de-energized, said thermistor turning off the start capacitor means after said motor reaches operating speed.

2. An improved control circuit as in claim 1 including means for providing a discharge path for the run capacitor means during the off cycle of said two-speed motor.

3. An improved control circuit as in claim 1, wherein said low speed contactor means includes normally open contacts for connecting said low speed start winding in circuit with a source of power upon energization of the low speed contactor means, and said high speed contactor means includes normally open contacts for connecting said high speed start winding in circuit with the source of power upon energization of the high speed contactor means.

4. An improved control circuit as in claim 3 wherein the start capacitor means includes a first capacitor and a second capacitor, said high speed contactor means including a normally open contact in series with the first capacitor, whereby during low speed motor operation, the second start capacitor is in the circuit to the low speed start winding and during high speed motor operation, the contact in series with the first capacitor is also in the circuit to the high speed start winding.

* * * * *